Feb. 18, 1947.   J. H. BALLARD   2,415,984
PISTON AND RING GROOVE LINING THEREFOR
Filed April 23, 1945

Inventor
John H. Ballard
By Liverance
Van Antwerp
Attorneys

Patented Feb. 18, 1947

2,415,984

UNITED STATES PATENT OFFICE 2,415,984

PISTON AND RING GROOVE LINING THEREFOR

John H. Ballard, Muskegon, Mich., assignor to Sealed Power Corporation, Muskegon, Mich., a corporation of Michigan Application April 23, 1945, Serial No. 589,741

5 Claims. (Cl. 309—44)

I have heretofore made application for a ring groove protector for the piston ring receiving grooves in pistons of internal combustion engines, having Serial No. 561,069, filed October 30, 1944. Pistons in internal combustion engines are in many instances made from material which is relatively soft, such as aluminum or aluminum alloy. The piston rings are of a heavier, harder metal, usually cast iron. The rapid reciprocation of the pistons and their coming to a complete stop at the end of one and the beginning of another reciprocatory movement causes the heavier and harder cast iron rings to press and strike against the sides of the ring grooves in which they are located, due to inertia and other forces developed, and the ring grooves become battered and widened with loss in sealing effectiveness. Such upsetting of the piston metal occurs most frequently in the uppermost grooves of the pistons, which being located closest to the combustion chambers of the engines in which installed are subjected to high temperatures. As aluminum melts at a relatively low temperature, approximating 1000° F. and above, such high temperature softens the metal and it thereupon becomes more susceptible to the impact effects of the cast iron ring against it and to other battering effects due to friction of the rings in moving rapidly over cylinder walls together with the effects of gases of compression from the combustion chambers. Therefore ring grooves of such pistons and particularly the uppermost ring grooves are widened, and the effects of such inertia and other effects is increased with the widening shortly rendering the sealing functions of the piston rings ineffective or at least greatly decreased in effectiveness.

It is an object and purpose of the present invention to provide a material improvement in connection with the invention disclosed in my aforesaid application for the purpose of insuring proper installation of the ring protectors in the ring grooves of pistons and at the same time have a certainty that the piston rings shall be freely expansible and retractible in the ring grooves and not bind against the protective rail or rails used in a ring groove. As the upper side of an upper ring groove in an aluminum or aluminum alloy piston is subjected to the highest temperatures when in service in an internal combustion engine, the protector which I have developed has its greatest utility at such upper side of the ring in a piston of a relatively soft metal material, but it is also of utility for the purpose of protecting both the upper and lower side of the ring groove.

An understanding of the invention may be obtained from the following description taken in connection with the accompanying drawing, in which Fig. 1 is a fragmentary section through the upper end of a piston showing the application of my invention for protecting the upper side of the upper ring groove in a piston.

Like reference characters refer to like parts in the different figures of the drawing.

Figure 1:
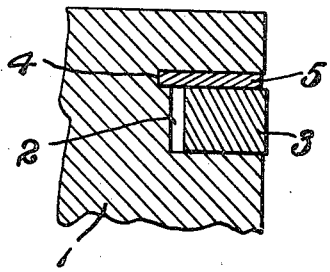
Figure 2:
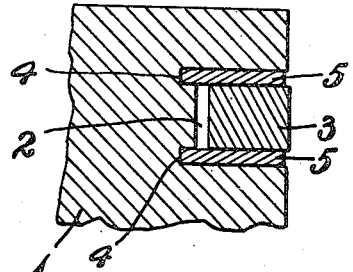
Fig. 2 is a similar section showing the protector at both the upper and lower sides of the ring groove with the piston ring therebetween.

The piston 1 has the usual ring receiving grooves 2, the upper groove only being shown in Figs. 1 and 2. Such ring groove normally receives a parted expansible piston ring 3 therein which when free to do so, will spring open at the parting but when in service within an engine cylinder is nearly closed at the parting, resulting in a tension in the ring which will cause it to tend to spring outward, thus bearing at its outer curved surface snugly against the inner walls of the cylinder. In usual practice the upper and lower sides of the piston ring used are closely adjacent the upper and lower sides of the ring groove in which located, with a slight clearance between the adjacent sides of the ring and ring groove to permit the free expansion of the ring or its contraction as it may move over the inner walls of a cylinder, insuring that its outer bearing face will remain at all times in contact with the cylinder walls.

With my invention, as in Fig. 1, if the protecting rail is to be used only at the upper side of the piston ring, the ring groove is widened a predetermined amount and at the upper inner annular corners of the ring groove a narrow groove 4 is cut deeper into the body of the piston extending inwardly of the bottom of the ring groove 2. A thin rail 5, preferably of steel, and in any event of a harder and tougher metal than that of the piston, and having a greater radial dimension than the piston ring is located against the upper side of the ring groove. The rail 5 has a thickness very slightly less than the vertical dimension of the narrow groove 4. It has a radial dimension greater than that of the piston ring 3 so that when installed, as in Fig. 1, with its inner curved edge seated at the bottom of the groove 4, its outer edge will reach nearly to the outer bearing face of the ring 3 and, preferably, will terminate very slightly short of the outer sides of the piston.

Figure 3:
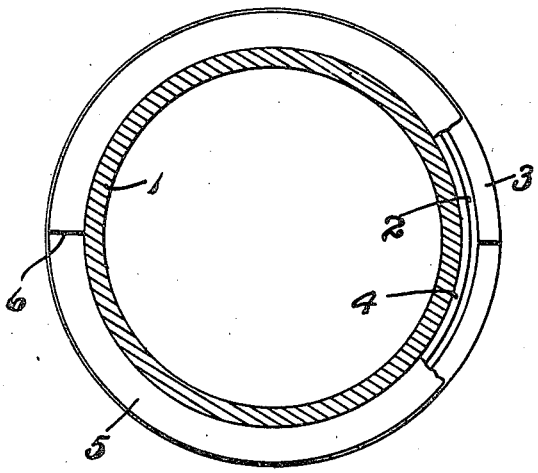
Fig. 3 is a horizontal section and plan with parts broken away, the section being taken in the plane of the upper side of the upper ring protector.
Figure 4:
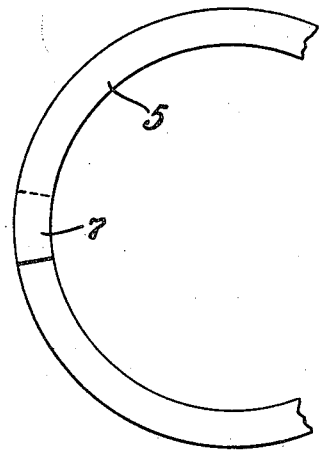
Fig. 4 is a fragmentary plan of one of the rails which may be applied, either at the upper side or both sides of a piston ring located in a piston ring groove and in a preferred form in which, when free and unrestrained, the ends of the protecting rail at the parting will overlap.

The protecting rail 5, preferably, is of a contracting instead of an expanding type. Or as shown in Fig. 4, the rail when free and unrestrained, at its parting 6, will overlap at its ends as indicated at 7. Therefore, when the rail is installed in a piston ring groove and the ends at the parting 6 are in very nearly abutting relation (Fig. 3) said rail has a tendency to contract and will hug or grip the bottom of the groove 4, as described in my earlier application.

In Fig. 2 the rails 5 are shown at both the upper and lower sides of the piston ring 3, and correspondingly the ring groove 2 is widened a sufficient amount to receive both rails and two annular narrow grooves 4 are cut one at the upper and the other at the lower inner annular corners of the ring groove 2.

In my previous application the rails were to be flat. The practical production of flat rails of the character described and which are thin, usually in the neighborhood of .025" in thickness, and with a radial dimension several times such thickness in the number of thousands, one after another, is a substantial impossibility, and they will depart from or be dished away from perfectly flat planes, one side or the other of such planes, in varying amounts of a few thousandths of an inch, and many times in amounts more than sufficient to take up the tolerance clearance which the piston ring has or should have for its free expansion and retraction in use; and if said rails are improperly installed with the dish in the wrong direction it may result in a binding of the ring against the adjacent side of the piston ring and interfere with the desired freedom contractions and expansions of the piston ring. In the present invention the rails designedly are all made of a dished character; that is, the plane of the body of the ring itself is inclined a few thousandths of an inch to any horizontal surface upon which it may lie.

Figure 5:
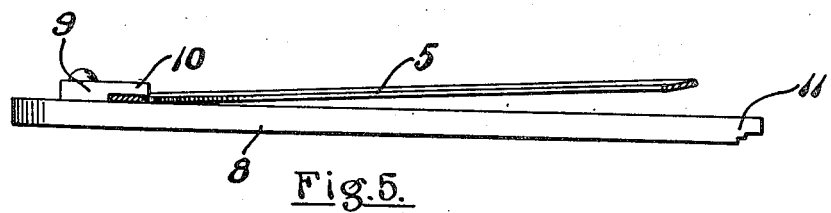
Fig. 5 is an elevation of a tool preferably used in the process of the installation to insure that the dished protecting rail used in the present invention shall be properly located and installed.
Figure 6:
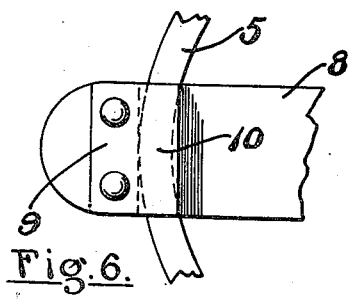
Fig. 6 is a fragmentary plan view at one end thereof.

With the present invention, such dished rail when installed at the upper side of a piston ring 3, is installed with its dish up; and when at the lower side of the ring with its dish down. To insure certainty that the installation shall be thus made a simple and convenient tool (Fig. 5) is provided. It consists of a bar 8 of flat metal, the length of which is greater than the exterior diameter of the ring. At one end and at its upper side a flat block 9 is permanently secured by rivets or otherwise. Said block has an overhanging lip 10 as shown, the underside of which is spaced from the upper side of the bar a distance substantially equal to the width of the groove 4 which is to be cut in the piston. The rail 5 at one edge portion is inserted into this space or slot, as in Fig. 5, and when thus inserted the rail should incline upward at a slight acute angle to the upper side of the bar 8. Said bar 8 at its opposite end 11 may be shaped with progressive steps of thickness as shown to facilitate the pressing and pushing inward of the rail 5 into the groove 4 with which it is to engage. Attempts to insert the rail 5 into the slot between the overhanging lip 10 and bar 8 with the rail reversed in position from that shown in Fig. 5 will normally be unsuccessful, and in any event will inform the workman that the dish in such case is down, as the rail will be snugly pressed against the bar 8 at points diametrically opposite where it is located between said lip 10 and said bar.

With such dished rail, the thickness of the rail plus its dish being greater than the width of the groove 4, when installed it is snugly pressed against the adjacent upper side of the ring groove 2, if its dish is upward, as it should be, and will grip and bind against said upper side of the groove. Correspondingly with the dish reversed or down, the protector rail will press or bind against the lower side of the ring groove when used at such lower side of the groove. The sides of the groove 4 will also grip those annular edge portions of the rails which are inserted into said grooves, and it is normally necessary to press and force the rails 5 fully into place so that their inner curved edges seat against the bottoms of said grooves 4. Therefore, it is not so important in the present application that the ends of the rail 5 overlap when free to do so (as in Fig. 4) as a rail made with its ends normally merely coming together or abutting when free at its parting 6 is of utility, because of the gripping and binding against the upper and lower sides of the groove 4 even with a binding and gripping against the bottom of the groove not taking place. However, preferably, the rail 5 will, in its free condition, overlap at its ends at its parting but the invention is not necessarily restricted thereto.

With the piston ring 3 installed as described, either with the protection rail only at the upper side of the piston ring (Fig. 1) or at both the upper and lower sides (Fig. 2), said rails become in effect as though integral with the piston and always press with an elastic force against the adjacent sides of the ring groove. This positively insures the necessary tolerances between a flat side or sides of the piston ring 3 and the adjacent sides of the protecting rails. Being thus snugly and forcefully pressed against the metal of the piston no hammering or peening action takes place between said rails and the piston. The impacts caused by the effects of inertia or otherwise of the piston ring 3 are directly against the rails 5, which are of a metal which does not easily batter and upset nor is it softened and made more easily subject to battering, peening or upsetting by reason of the high temperatures encountered. The rails are anchored firmly and snugly in the grooves 4 either alone by the gripping of their sides against said rails or additionally, the gripping of the rails against the bottoms of the grooves.

The outer edges of the rails 5 do not extend to the walls of the piston. Such rails are not designed to provide sealing between the piston and cylinder walls. Furthermore if they did engage the cylinder walls, not being free to contract they would be liable to scuff or score such walls. The rails, preferably of steel and much more resistant to high temperatures than the piston material are not affected by engine operation as is the softer lower melting material of the piston, and the reconditioning of the ring grooves of pistons and particularly the upper grooves therein is not required as often, if at all, as in the case of piston ring grooves unprotected and in which the upper and lower sides of a piston ring are in substantially direct engagement.

It is apparent that the present invention is of utility both for installations in new engines or for replacing piston rings in the grooves of pistons in which the rings have become worn or the ring grooves have become battered and widened or when both of such conditions occur. If new pistons are equipped initially with my invention replacement of the piston rings may at times become desirable because of the wear of both rings and the cylinder walls but it will be at longer intervals of time and will seldom if ever require a widening and reconditioning of the ring grooves.

The invention is defined in the appended claims and is to be considered comprehensive of all forms of structure coming within their scope.

I claim:

1. A piston having a ring receiving groove therein, said groove at a side thereof having a connecting narrow continuous annular groove in the piston extending inwardly from the bottom of the ring groove, an annular thin rail of a material harder than the material of the piston, said rail being parted at one side and located against said side of the piston ring and extending at its inner edge portions into said narrow groove, the outer edges of said rail extending substantially to the outer surface of said piston, said thin rail being dished so that when located in a horizontal plane with its inner edge substantially in said plane its outer edge is spaced a short distance from said plane, said rail being located against the side of the ring groove with its dish in the direction of said side of the groove.

2. A piston having a ring receiving groove therein, said groove at a side thereof having a connecting narrow continuous annular groove extending inwardly from the bottom of the ring groove with one side of the piston ring groove and a side of the narrow groove lying in the same plane, a thin annular rail of a material harder than the material of the piston, said rail being parted at one side and normally contracting so that the ends at the parting may overlap, located against a side of the piston ring and extending at its inner edge portions into said narrow groove and bearing against the bottom thereof, said rail being dished with its dish in the direction of the adjacent side of the piston ring groove whereby when the inner edge portions of the rail are located within said narrow groove, the dished rail presses against the adjacent side of the ring groove and is under tension strain insuring such pressing.

3. A piston of aluminum or the like having a piston ring groove therein, the normal axial dimension of which is slightly greater than the axial dimension of a piston ring to be located therein, said ring groove at its upper side in a vertical piston having a narrow groove having a width substantially equal to the distance that the normal groove is widened extending into the piston from the bottom of the ring groove, the upper sides of said narrow groove and said widened ring groove lying in the same plane, and a parted dished annular rail of ferrous metal located at the upper side of the ring groove and having its inner edge portions disposed in said narrow groove and forming a protective lining for the upper side of said piston ring groove and bearing with pressure thereagainst, said dished rail being located with its dish disposed upwardly, whereby when installed the dished rail is strained toward a flat condition thereby producing a continuing tension in the rail which forces it against the upper side of the groove.

4. A construction as defined in claim 3, said piston ring groove at its lower side being correspondingly widened and a second narrow groove correspondingly provided at the bottom of the ring groove, the lower side of the additionally widened ring groove and of the second narrow groove lying in the same plane, and a like dished thin rail of ferrous metal disposed with its inner edge portions inserted into said second narrow groove, with the dish of the rail in a down direction.

5. A construction as defined in claim 3, said rail of ferrous metal normally contracting when free to do so whereby its ends at its parting overlap so that when entered into the narrow groove to receive it, said rail will bear with pressure against the lower side thereof.

JOHN H. BALLARD.

REFERENCES CITED

The following references are of record in the file of this patent:

UNITED STATES PATENTS

| Number | Name | Date |
|---|---|---|
| 1,958,313 | Powell | May 8, 1934 |
| 2,228,495 | Williams | Jan. 14, 1941 |

FOREIGN PATENTS

| Number | Country | Date |
|---|---|---|
| 413,050 | British | July 12, 1934 |
| 401,085 | British | Nov. 9, 1933 |
| 455,539 | French | July 1, 1925 |
| 817,893 | French | Sept. 13, 1937 |
| 487,709 | German | Dec. 17, 1929 |